(12) United States Patent
Yan et al.

(10) Patent No.: US 10,511,970 B2
(45) Date of Patent: Dec. 17, 2019

(54) INTERNET ACCESS AUTHENTICATION METHOD AND CLIENT, AND COMPUTER STORAGE MEDIUM

(71) Applicant: TENCENT TECHNOLOGY (SHENZHEN) COMPANY LIMITED, Shenzhen (CN)

(72) Inventors: Peng Yan, Shenzhen (CN); Junda Li, Shenzhen (CN); Chenyun Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 67 days.

(21) Appl. No.: 15/712,318

(22) Filed: Sep. 22, 2017

(65) Prior Publication Data

US 2018/0014194 A1    Jan. 11, 2018

Related U.S. Application Data

(63) Continuation of application No. PCT/CN2016/082459, filed on May 18, 2016.

(30) Foreign Application Priority Data

Aug. 12, 2015   (CN) .......................... 2015 1 0493925

(51) Int. Cl.
*H04W 12/06* (2009.01)
*H04W 40/02* (2009.01)
(Continued)

(52) U.S. Cl.
CPC ............ *H04W 12/06* (2013.01); *G06F 21/31* (2013.01); *H04W 40/02* (2013.01); *H04W 84/12* (2013.01); *H04W 88/16* (2013.01)

(58) Field of Classification Search
CPC ..... H04W 12/06; H04W 84/12; H04W 40/02; H04W 88/16; G06F 21/31
See application file for complete search history.

(56) References Cited

U.S. PATENT DOCUMENTS

| 8,918,841 B2 | 12/2014 | Chawla et al. |
| 2002/0010758 A1* | 1/2002 | Chan .................. G06Q 30/0241 709/218 |

(Continued)

FOREIGN PATENT DOCUMENTS

| CN | 101702717 A | 5/2010 |
| CN | 102340527 A | 2/2012 |

(Continued)

OTHER PUBLICATIONS

The World Intellectual Property Organization (WIPO) International Search Report for PCT/CN2016/082459 dated Jul. 27, 2016 5 Pages (including translation).

(Continued)

*Primary Examiner* — Cheng-Feng Huang
(74) *Attorney, Agent, or Firm* — Anova Law Group, PLLC (57) ABSTRACT

The present disclosure discloses an Internet access authentication method and client, and a computer storage medium. The Internet access authentication method includes establishing a network connection to a subnetwork; displaying, in a browser, a login page specified by a wireless access point, a network application icon used for Internet access being displayed on the login page; receiving an operation on the network application icon, and authenticating first data by sending the first data to a network server, the first data comprising: a gateway address, a wireless access point address, and a device address; and making a network connection when authentication on the first data succeeds.

9 Claims, 4 Drawing Sheets

(51) Int. Cl.
*G06F 21/31* (2013.01)
*H04W 88/16* (2009.01)
*H04W 84/12* (2009.01)

(56) References Cited

U.S. PATENT DOCUMENTS

| | | | |
|---|---|---|---|
| 2005/0216421 A1* | 9/2005 | Barry | G06F 11/0709 |
| | | | 705/64 |
| 2006/0104224 A1* | 5/2006 | Singh | G06F 21/32 |
| | | | 370/310 |
| 2011/0211548 A1* | 9/2011 | Russel | H04L 29/12207 |
| | | | 370/329 |
| 2014/0171056 A1* | 6/2014 | Jafarian | H04W 52/0216 |
| | | | 455/418 |
| 2014/0258441 A1* | 9/2014 | L'Heureux | H04W 12/06 |
| | | | 709/217 |
| 2015/0020214 A1* | 1/2015 | Copsey | G06F 21/6218 |
| | | | 726/27 |
| 2015/0031289 A1* | 1/2015 | Agarwal | H04W 4/80 |
| | | | 455/41.1 |
| 2016/0156719 A1* | 6/2016 | Mobarak | H04L 67/141 |
| | | | 726/4 |
| 2018/0032997 A1* | 2/2018 | Gordon | G06Q 20/3224 |

FOREIGN PATENT DOCUMENTS

| | | |
|---|---|---|
| CN | 103297966 A | 9/2013 |
| CN | 103796278 A | 5/2014 |
| CN | 103906063 A | 7/2014 |
| CN | 104038555 A | 9/2014 |
| CN | 104394512 A | 3/2015 |
| CN | 104685469 A | 6/2015 |
| CN | 104717218 A | 6/2015 |
| CN | 105007581 A | 10/2015 |
| KR | 20120066268 A | 6/2012 |
| KR | 20130125055 A | 11/2013 |

OTHER PUBLICATIONS

The State Intellectual Property Office of the People's Republic of China (SIPO) Office Action 1 for 201510493925.9 dated Nov. 9, 2016 7 Pages (including translation).

The State Intellectual Property Office of the People's Republic of China (SIPO) Office Action 2 for 201510493925.9 dated Mar. 23, 2017 7 Pages (including translation).

Korean Intellectual Property Office (KIPO) Office Action 1 for 10-2017-7033065 dated Apr. 10, 2018 7 Pages (including translation).

* cited by examiner

INTERNET ACCESS AUTHENTICATION METHOD AND CLIENT, AND COMPUTER STORAGE MEDIUM

RELATED APPLICATION

This patent application is a continuation application of PCT Application No. PCT/CN2016/082459 filed on May 18, 2016, which claims priority to Chinese Patent Application No. 201510493925.9, filed by Tencent Technology (Shenzhen) Company Limited on Aug. 12, 2015, and entitled "INTERNET ACCESS AUTHENTICATION METHOD AND CLIENT." The two applications are both incorporated by reference in the entirety.

FIELD OF THE TECHNOLOGY

The present disclosure relates to network authentication technologies, and in particular, to an Internet access authentication method and client, and a computer storage medium.

BACKGROUND OF THE DISCLOSURE

With the fast development of Internet technologies, various local area networks such as a network in a company, a network on a bus, and a network in a shop are widely used.

However, in many authentication processes, the phone number of the user needs to be obtained. It may be time-consuming to enter the phone number. User privacy may be impaired, resulting in that the user receiving undesired messages. In addition, the user often needs to wait for the short message service (SMS) password, resulting in the user not being able to access the Internet timely. Further, the user may need to actively obtain the password by inquiry, and manually enter the password, which is inconvenient. In addition, an application having a WIFI connection function needs to be programmed, resulting in high system improvement costs.

SUMMARY

To resolve the foregoing technical problem, embodiments of the present disclosure provide an Internet access authentication method and client, and a computer storage medium.

One aspect of the present disclosure provides an Internet access authentication method implemented by a computing terminal having at least one processor. The Internet access authentication method includes establishing a network connection to a subnetwork; displaying, in a browser, a login page specified by a wireless access point, a network application icon used for Internet access being displayed on the login page; receiving an operation on the network application icon, and authenticating first data by sending the first data to a network server, the first data comprising: a gateway address, a wireless access point address, and a device address; and making a network connection when authentication on the first data succeeds.

Another aspect of the present disclosure provides an Internet access authentication client, comprising: a memory, a processor coupled to the memory, a connector, configured to establish a network connection to a subnetwork; a browser executed by the processor, configured to display, a login page specified by a wireless access point, network application icon for Internet access being displayed on the login page; to obtain an operation on the network application icon; to send the first data to a network server, the first data comprising: a gateway address, a wireless access point address, and a device address; and a lifting unit executed by the processor, configured to lift a network restriction when authentication on the first data succeeds.

Another aspect of the present disclosure provides a computer storage medium, the computer storage medium storing a computer executable instruction, and the computer executable instruction being configured to perform the Internet access authentication method. The method includes: establishing a network connection to a subnetwork; displaying, in a browser, a login page specified by a wireless access point, a network application icon used for Internet access being displayed on the login page; receiving an operation on the network application icon, and authenticating first data by sending the first data to a network server, the first data comprising: a gateway address, a wireless access point address, and a device address; and making a network connection when authentication on the first data succeeds.

In the technical solutions of the embodiments of the present disclosure, a user may select WIFI to establish a network connection to a subnetwork. The subnetwork herein may refer to a local area network, that is, a WIFI network. A login page specified by an AP is displayed in a browser when the browser window is opened. There is a network application icon used for Internet access on the login page. When the user clicks the network application icon, authentication is automatically completed by using an App, to lift a network restriction.

DESCRIPTION OF EMBODIMENTS

To make the features and technical content of the embodiments of the present disclosure more compressible, the following describes implementations of the embodiments of the present disclosure in detail with reference to accompanying drawings. The accompanying drawings are intended only for reference, and not intended to limit the embodiments of the present disclosure.

To understand the technical solutions of the embodiments of the present disclosure clearer, the technical terms in the embodiments of the present disclosure are described in details as follows:

App: It may be a third-party software application on a smartphone or on a wireless network.

Portal: Usually, portal authentication may also be referred to as web authentication, and a portal authentication website is generally referred to as a portal site. When an unauthorized user accesses the Internet, an electronic device forcibly directs the user to a specified site, and the user may access a service in the site for free. When the user needs to use another service in the Internet, the user needs to be authenticated on the portal site, and may use an Internet resource only when authentication succeeds.

AP: It may be a wireless switch used in a wireless network, and is also a core of the wireless network.

Wireless access control (AC): It may be responsible for gathering data from different APs and accessing the Internet, and completing control functions, such as configuration and management on AP devices, authentication and management on wireless users, broadband access, and security.

ap_mac: It may be a MAC address of a router in the wireless network.

Browser: It may be a mobile Internet tool used by a user to browse Internet content on a terminal by using a wireless communications network, in which a major App is web page browsing, and many Apps, such as navigation, community, multi-media, weather, and stock market, may be integrated to provide all-round mobile Internet services for the user.

Uniform resource locator (URL): It may be a concise representation of a location of a resource that may be obtained from the Internet and an access method, and is an address of a standard resource on the Internet. Each file on the Internet has a unique URL, and information included in the URL indicates a location of the file and how the browser needs to process the file.

gateway_id: It may be a unique identifier of an AP gateway in an App background.

phone_mac: It may be a MAC address of a mobile phone.

There are many network authentication processes. In a first example of network authentication, authentication is performed by using a short message service (SMS) message for Internet access. Specifically, the user connects to a wireless fidelity (WIFI) hotspot without a password, and forcibly opens a web authentication page to browse page content. The user enters a correct phone number on the authentication page, and a mobile phone receives an SMS message sent by a network operator and including an authentication password. The user enters, on the authentication page, the authentication password provided by the network operator, and accesses the Internet by means of WIFI after authentication succeeds.

In another example of network authentication, authentication is performed by using a password for Internet access. Specifically, the user obtains a WIFI password by an inquiry. The user connects to a WIFI hotspot, and enters the WIFI password for Internet access.

In another example of network authentication, automatic authentication/one-click authentication is performed by using an application (App) for Internet access. Specifically, the user connects to a WIFI hotspot without a password, or automatically connects to a WIFI hotspot of a specified service set identifier (SSID) by using an App; and then opens the App for automatic authentication or one-click authentication, and directly accesses the Internet.

Figure 1:
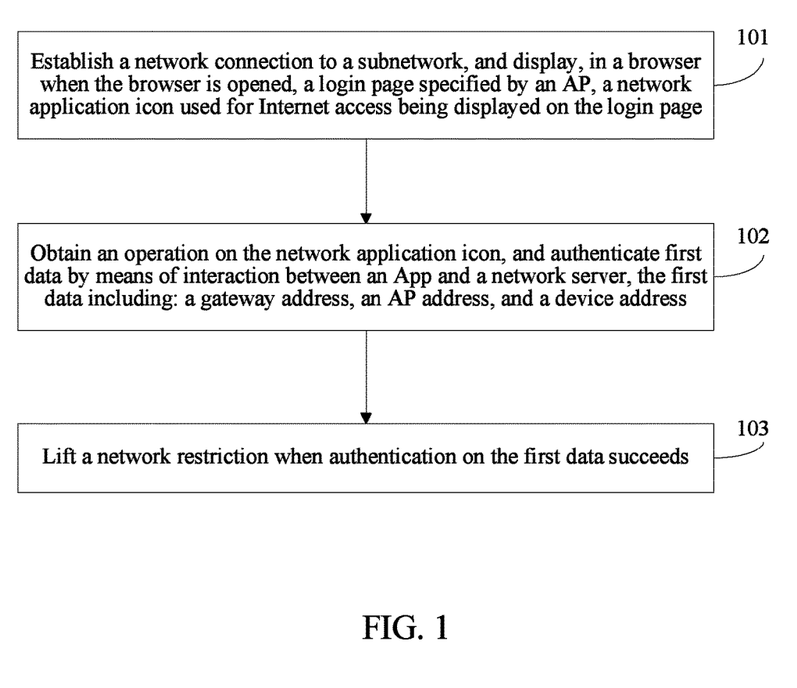
FIG. 1 is a schematic flowchart of an Internet access authentication method according to an embodiment of the present disclosure.

FIG. 1 is a schematic flowchart of an Internet access authentication method according to one embodiment of the present disclosure. The method may be implemented by a computing terminal having at least one processor. As shown in FIG. 1, the Internet access authentication method includes the following operations.

Operation 101. Establish a network connection to a subnetwork, and display, on a browser when the browser is opened, a login page specified by an AP. There may be a network application icon used for Internet access on the login page.

The technical solutions in this embodiment of the present disclosure is applied to an electronic device, such as a mobile phone or a tablet computer.

In this embodiment of the present disclosure, the electronic device has a local area network function, that is, a user may select a subnetwork on the electronic device, that is, a local area network or a WIFI network, and then establishes a network connection to the subnetwork. Herein, each subnetwork corresponds to a unique SSID.

In this embodiment of the present disclosure, the browser obtains an operation of accessing a first address, the browser sends a first address access request to the AP, and the browser receives the login page specified by the AP, the login page being corresponding to a second address.

Figure 4:
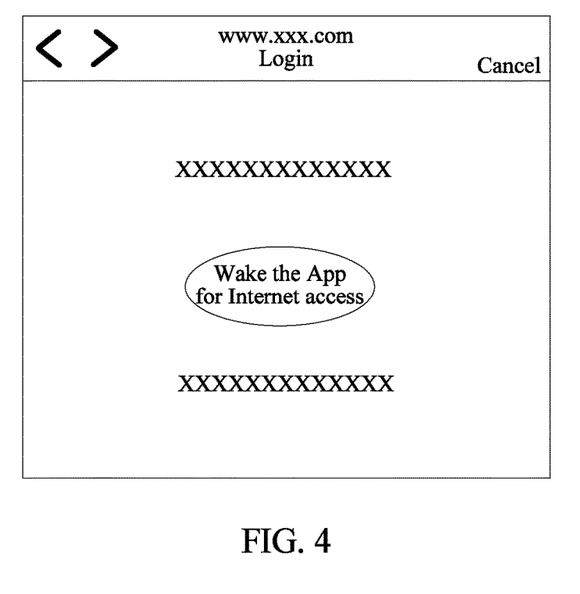
FIG. 4 is a schematic diagram of a login page according to an embodiment of the present disclosure.

Specifically, the user opens the browser window, and enters a first address on the browser. The first address is any web address entered by the user. The browser obtains the operation of accessing the first address. The browser sends a first address access request to the AP, and the AP returns a specified login page to the browser. The login page corresponds to a second address. The login page is a portal page. Referring to FIG. 4, there is a network application icon on the login page. The icon may be named wake up the App for Internet access, and the user may click the network application icon for one-click Internet access. Herein, the network application icon may be a touch icon, or may be a non-touch icon. When the network application icon is a touch icon, the user may implement one-click Internet access by a touch operation. When the network application icon is a non-touch icon, the user may activate the network application icon in another manner, for example, clicking using a mouse or hitting a particular function key or a key combination on a keyboard, to implement one-click Internet access. The network application icon may be implemented in various manners, and the user may implement one-click Internet access by multiple operations.

Operation 102. Obtain an operation on the network application icon, and authenticate first data by means of interaction between an App and a network server, the first data including: a gateway address, an AP address, and a device address.

In this embodiment of the present disclosure, the operation on the network application icon is obtained, and the AP is requested to temporarily lift a restriction. After the AP temporarily lifts the restriction successfully, the browser sends the first data to the App, so that the App obtains a multi-media page from an App server according to the first data. The App accesses the multi-media page, and sends the first data to the network server. Internet access authentication succeeds when authentication on the first data by the network server succeeds.

In this embodiment of the present disclosure, when the AP is requested to temporarily lift the restriction, device information is sent to the AP by using a request message.

In this embodiment of the present disclosure, after the AP temporarily lifts the restriction successfully, a temporarily lifting restriction success message sent by the AP is received. The temporarily lifting restriction success message includes the first data.

In this embodiment of the present disclosure, the browser receives and displays data of the multi-media page after authentication on the first data by the network server succeeds. The network server controls the AP to lift the network restriction.

Specifically, the user clicks the network application icon on the login page, and the browser sends a request message to the AP to request to temporarily lift the restriction. The request message carries device information, such as ap_mac and ip. The AP saves the device information. After the AP temporarily lifts the restriction successfully, the AP sends first data, such as gateway_id, ap_mac, and phone_mac, to the browser, to temporarily allow the electronic device to pass. The browser wakes up the App, and sends the first data, such as gateway_id, ap_mac, and phone_mac, to the App. The App requests a to-be-opened multi-media page from the App server according to data such as gateway_id. The App server returns, to the App, a URL of the multi-media page and data such as gateway_id, ap_mac, and phone_mac. The App accesses the multi-media page and transfers the data such as gateway_id, ap_mac, and phone_mac to the network server. The network server checks the data transferred by the App, and after the data is checked as correct, normally allows the electronic device to pass, referring to the following operation 103.

Operation 103. Lift a network restriction when authentication on the first data succeeds.

In this embodiment of the present disclosure, after the network restriction is lifted, the electronic device exchanges network data with the AP.

In this embodiment of the present disclosure, a network application icon used for Internet access is added to a specified login page, an App is woken up by clicking the touch icon, and authentication on an electronic device by a network server is implemented by means of background interaction between the App and the network server, to implement Internet access. In this embodiment of the present disclosure, user operations are simple and automated by the system; user privacy is protected; the speed for a user terminal to connect to WIFI for Internet access is greatly reduced; and App usage is increased.

In the technical solutions of this embodiment of the present disclosure, a user selects WIFI, to establish a network connection to a subnetwork. The subnetwork herein refers to a local area network, that is, a WIFI network. A login page specified by an AP is displayed in a browser when the browser window is opened. There is a network application icon used for Internet access on the login page. When the user clicks the network application icon, authentication is automatically completed by using an App, to lift a network restriction. In this embodiment of the present disclosure, the user needs to only connect to WIFI and open the browser window, and the browser automatically displays the login page, that is, a portal page. Then the user clicks the network application icon on the portal page, to trigger the App to automatically undergo Internet access authentication for Internet access.

According to the technical solutions of this embodiment of the present disclosure, phone number information of the user does not need to be obtained, the user does not need to wait for an SMS password and may access the Internet by clicking the network application icon, and the user neither needs to actively inquire about a password, nor needs to manually enter a password. Therefore, no independent App having a WIFI function needs to be programmed, and therefore reduce the cost for any software or system customization.

Figure 2:
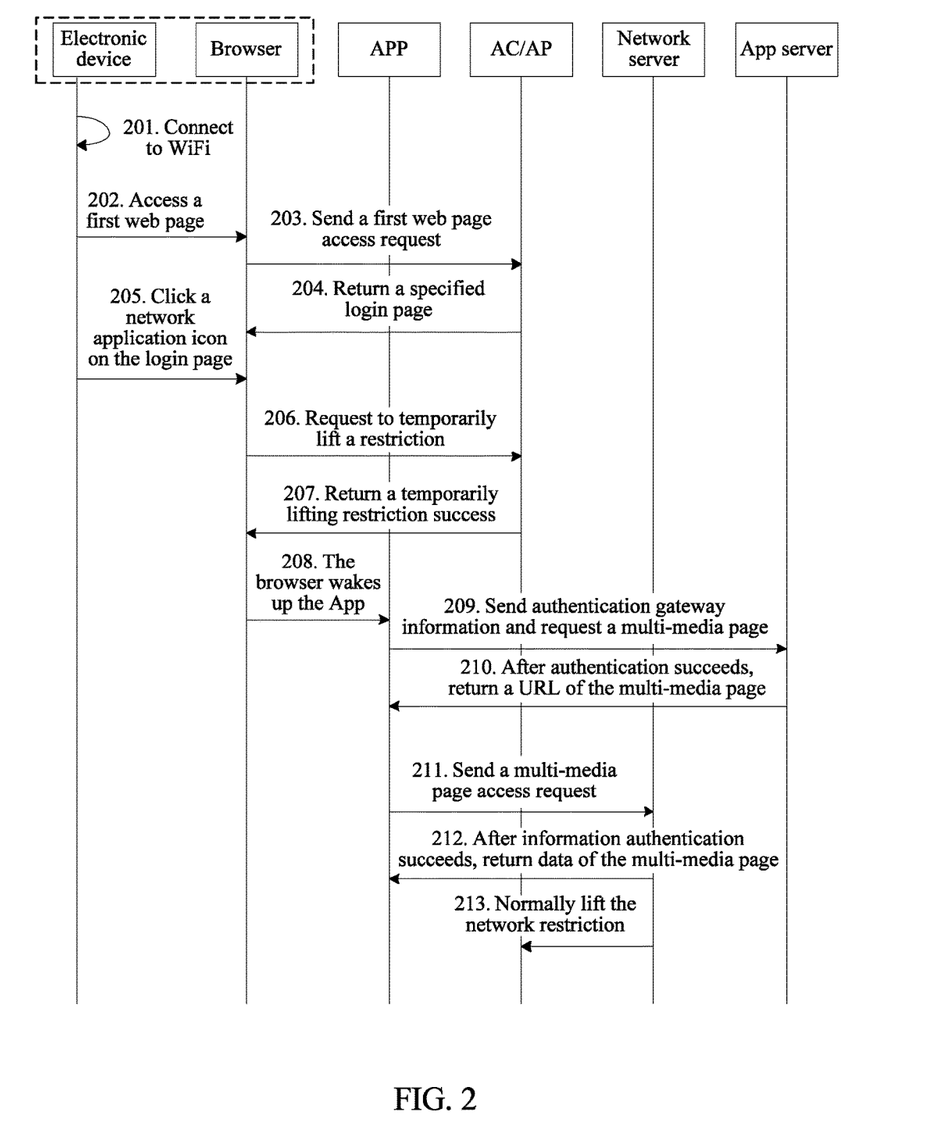
FIG. 2 is a schematic flowchart of an Internet access authentication method according to an embodiment of the present disclosure.

FIG. 2 is a schematic flowchart of an Internet access authentication method according to an embodiment of the present disclosure. As shown in FIG. 2, the Internet access authentication method includes the following operations executed by a browser and a network server.

Operation 201. Connect to WIFI.

Operation 202: A browser accesses a first web page.

Operation 203. The browser sends a first web page access request to an AC/AP.

Operation 204. The AC/AP returns a specified login page to the browser.

Operation 205. Click a network application icon, such as a touch icon of an App, on the login page.

Operation 206. The browser requests the AC/AP to temporarily lift a restriction.

Operation 207. The AC/AP returns a temporarily lifting restriction success to the browser.

Operation 208. The browser wakes up the App.

Operation 209. The App sends authentication gateway information to an App server and requests a multi-media page from the App server.

Operation 210. After authentication succeeds, the App server returns a URL of the multi-media page to the App.

Operation 211. The App sends a multi-media page access request to a network server.

Operation 212. After information authentication succeeds, the network server returns data of the multi-media page to the App.

Operation 213. The network server controls the AC/AP to normally lift the network restriction.

In this embodiment of the present disclosure, a network application icon used for Internet access is added to a specified login page, an App is woken up by clicking the touch icon, and authentication on an electronic device by a network server is implemented by means of background interaction between the App and the network server, to implement Internet access. In this embodiment of the present disclosure, user operations are simple and automated by the system; user privacy is protected; the speed for a user terminal to connect to WIFI for Internet access is greatly reduced; and App usage is increased.

Figure 3:
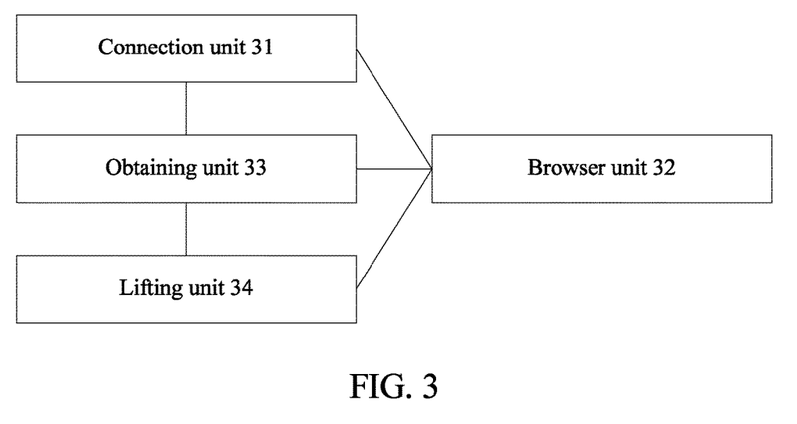
FIG. 3 is a schematic structural diagram of a client according to an embodiment of the present disclosure.

FIG. 3 is a schematic structural diagram of an Internet access authentication client according to an embodiment of the present disclosure. The client may include: a memory, a processor coupled to the memory, a connector, a browser executed by the processor, and a lifting unit executed by the processor. In some embodiments, the processor may also be executed by the processor. As shown in FIG. 3, the client includes the following components: a connection unit 31, configured to establish a network connection to a subnetwork; a browser unit 32, configured to display, on a browser when the browser is opened, a login page specified by an AP, there being a network application icon used for Internet access on the login page; an obtaining unit 33, configured to obtain an operation on the network application icon; the browser unit 32 being further configured to authenticate first data by means of interaction between an App and a network server. The first data may include a gateway address, an AP address, and a device address. The first data may include other data required by the network server to authenticate a client. The client also may include a lifting unit 34, configured to lift a network restriction when authentication on the first data succeeds.

The browser unit 32 is further configured to request the AP to temporarily lift the restriction; and after the AP temporarily lifts the restriction successfully, send the first data to the App, so that the App obtains a multi-media page from an App server according to the first data, where the App accesses the multi-media page, and sends the first data to the network server; and Internet access authentication succeeds when authentication on the first data by the network server succeeds.

The browser unit 32 is further configured to obtain an operation of accessing a first address; send a first address access request to the AP; and receive the login page specified by the AP, the login page being corresponding to a second address.

The browser unit 32 is further configured to: when requesting the AP to temporarily lift the restriction, send device information to the AP by using a request message; and after the AP temporarily lifts the restriction successfully, receive a temporarily lifting restriction success message sent by the AP, the temporarily lifting restriction success message including the first data.

The browser unit 32 is further configured to receive and display data of the multi-media page after authentication on the first data by the network server succeeds, where the network server controls the AP to lift the network restriction; and exchange network data with the AP.

Figure 5:
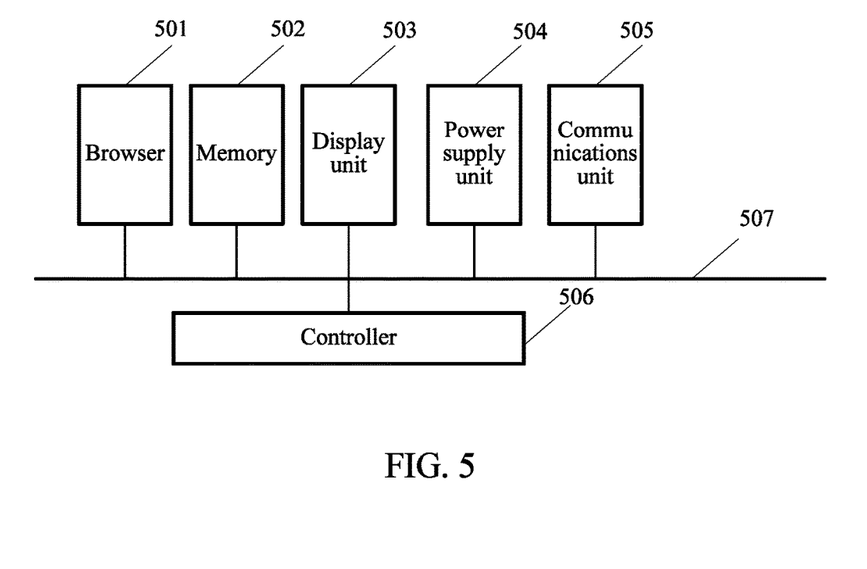
FIG. 5 is a schematic diagram of an optional hardware structure of an Internet access authentication client according to an embodiment of the present disclosure.

FIG. 5 is a schematic diagram of an optional hardware structure of an Internet access authentication client according to an embodiment of the present disclosure.

A browser 501 is configured to display content of an HTML file of a web page server or a file system, and implement interaction between a user and the file.

A memory 502 may be a storage medium in a form of a flash memory or a hard disk, configured to store cached data in the browser 501, and store an executable instruction that is read by a controller 506 by using a bus 507.

The file of the browser may be displayed in a display unit 503.

A power supply unit 504 is configured to supply power for other components in an electronic device 500. During actual application, the power supply unit 504 may be implemented as various storage batteries or power supply adapters.

A communications unit 505 is configured to perform mobile communication by using various communications standard, such as Code Division Multiple Access (CDMA), Wideband Code Division Multiple Access (WCDMA), Time Division-Synchronous Code Division Multiple Access (TD-SCDMA), and an evolved communications standard, or communicate in a wireless Internet manner, such as a wireless compatibility certification (WIFI) manner.

A person skilled in the art should understand that, the functions implemented by the units of the client shown in FIG. 3, are disclosed in related descriptions of the foregoing Internet access authentication method. The functions implemented by the units of the client shown in FIG. 3 may be implemented by a program running on a processor, or may be implemented by a specific logical circuit.

When the integrated module is implemented in the form of a software functional module and sold or used as an independent product, the integrated module may be stored in a computer-readable storage medium. A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, this application may be in a form of a computer program product that is implemented on one or more computer-usable storage media including computer-usable program code. The storage media may include, but not limited to, a USB flash drive, a removable hard disk, a read-only memory (ROM), a random access memory (RAM), a magnetic disk storage, a CD-ROM, an optical storage, and the like.

In the embodiments of the present disclosure, the user needs to only connect to WIFI and open the browser window, and the browser automatically displays the login page, that is, a portal page. Then the user clicks the network application icon on the portal page, to trigger the App to automatically undergo Internet access authentication for Internet access. According to the technical solutions of the embodiments of the present disclosure, phone number information of the user does not need to be obtained from the user, and the user does not need to wait for an SMS password, and may access the Internet by clicking the network application icon. The network application icon may include a touch icon and a non-touch icon, and is applicable to a touch interaction scenario of a smart terminal, and also applicable to a non-touch interaction scenario of a conventional terminal. In the embodiments of the present disclosure, the user neither needs to actively inquire about a password, nor needs to manually enter a password. Therefore, no independent App having a WIFI function needs to be programmed.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of this application.

Correspondingly, an embodiment of the present disclosure further provides a computer storage medium, storing a computer program. The computer program is configured to perform the Internet access authentication method in the foregoing embodiment of the present disclosure.

The technical solutions recorded in the embodiments of the present disclosure may be combined in any way provided that no conflict is caused.

In the several embodiments provided in the present disclosure, it should be understood that the disclosed method and intelligent device may be implemented in other manners. The described device embodiment is merely exemplary. For example, the unit division is merely a logical function division and there may be other division in actual implementation. For example, a plurality of units or components may be combined or integrated into another system, or some features may be ignored or not performed. In addition, the displayed or discussed mutual couplings or direct couplings or communication connections between parts may be implemented through some interfaces. The indirect couplings or communication connections between the devices or units may be implemented in electronic, mechanical, or other forms.

The units described as separate parts may or may not be physically separated, and parts displayed as units may or may not be physical units, which may be located in one position, or may be distributed on a plurality of network elements. Some or all of the units may be selected according to actual needs to achieve the objectives of the solutions of the embodiments.

In addition, functional units in the embodiments of the present disclosure may be integrated into one second processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. An Internet access authentication method implemented by a computing terminal having at least a processor, comprising:
    establishing a network connection to a subnetwork associated with a wireless access point;
    displaying, in a browser, a login page specified by the wireless access point, comprising:
        receiving, by the browser, an instruction of accessing a first web page;
        sending, by the browser, a first web page access request to the wireless access point; and
        receiving, by the browser, the login page specified by the wireless access point, the login page being corresponding to a second web page;
    displaying a network application icon representing an application used for Internet access on the login page;
    receiving, by the browser, a clicking operation on the network application icon;
    sending, by the application, a first data to a network server, the first data comprising a hardware information of the wireless access point and the computing terminal for the network server to authenticate the network connection, comprising:
        sending, by the browser, a request message to the wireless access point to request the wireless access point to temporarily lift a restriction, wherein the request message carries the first data comprising the hardware information of the wireless access point and the computing terminal;
        storing the first data comprising the hardware information of the wireless access point and the computing terminal in the wireless access point;
        after the wireless access point temporarily lifts the restriction successfully, sending, by the wireless access point, the first data comprising the hardware information of the wireless access point and the computing terminal to the browser, to temporarily allow the computing terminal to pass through the wireless access point for Internet access;
    authenticating, by the network server, the first data comprising the hardware information of the wireless access point and the computing terminal; and
    making the network connection when authentication on the first data succeeds, comprising:
        receiving and displaying, by the browser, data of a multi-media page after authentication on the first data by the network server succeeds, wherein the network server controls the wireless access point to lift the network restriction; and
        exchanging network data with the wireless access point.

2. The Internet access authentication method according to claim 1, wherein the receiving the clicking operation on the network application icon, and sending, by the application, the first data to a network server comprises:
    after the wireless access point temporarily lifts the restriction successfully, sending the first data to the application, so that the application obtains the multi-media page from an application server according to the first data, wherein the application accesses the multi-media page, and sends the first data to the network server; and Internet access authentication succeeds when authentication on the first data by the network server succeeds.

3. The Internet access authentication method according to claim 1, wherein
    when the wireless access point is requested to temporarily lift the restriction, device information is sent to the wireless access point by using a request message; and
    after the wireless access point temporarily lifts the restriction, a temporarily lifting restriction success message sent by the wireless access point is received, the temporarily lifting restriction success message comprising the first data.

4. An Internet access authentication client, comprising:
    a memory;
    a processor coupled to the memory;
    a connector, configured to establish a network connection to a subnetwork associated with a wireless access point;
    a browser executed by the processor, configured to:
        display, a login page specified by the wireless access point, comprising:
            obtain an instruction of accessing a first web page;
            send a first web page access request to the wireless access point; and
            receive the login page specified by the wireless access point, the login page being corresponding to a second web page;
        display, a network application icon representing an application used for Internet access on the login page;
        obtain a clicking operation on the network application icon;
        send a first data to a network server, the first data comprising a hardware information of the wireless access point and the computing terminal for the network server to authenticate the network connection, including:
            sending a request message to the wireless access point to request the wireless access point to temporarily lift a restriction, wherein the request message carries the first data comprising the hardware information of the wireless access point and the computing terminal, and the first data comprising the hardware information of the wireless access point and the computing terminal is stored in the wireless access point;

after the wireless access point temporarily lifts the restriction successfully, receiving, from the wireless access point, the first data comprising the hardware information of the wireless access point and the computing terminal, to temporarily allow the computing terminal to pass through the wireless access point for Internet access; and a lifting unit executed by the processor, configured to lift a network restriction when authentication on the first data succeeds, wherein the browser is further configured to:

receive and display data of a multi-media page after authentication on the first data by the network server succeeds, wherein the network server controls the wireless access point to lift the network restriction; and exchange network data with the wireless access point.

5. The Internet access authentication client according to claim 4, wherein the browser is further configured to send the first data to the application, so that the application obtains the multi-media page from an application server according to the first data, wherein the application accesses the multi-media page, and sends the first data to the network server; and Internet access authentication succeeds when authentication on the first data by the network server succeeds.

6. The Internet access authentication client according to claim 5, wherein the browser is further configured to: when requesting the wireless access point to temporarily lift the restriction, send device information to the wireless access point by using a request message; and after the wireless access point temporarily lifts the restriction successfully, receive a temporarily lifting restriction success message sent by the wireless access point, the temporarily lifting restriction success message comprising the first data.

7. A non-transitory computer storage medium, the non-transitory computer storage medium storing a computer executable instruction, and the computer executable instruction being configured to perform an Internet access authentication method, the method comprising:

establishing a network connection to a subnetwork associated with a wireless access point;

displaying, in a browser, a login page specified by the wireless access point, comprising:

receiving, by the browser, an instruction of accessing a first web page;

sending, by the browser, a first web page access request to the wireless access point; and receiving, by the browser, the login page specified by the wireless access point, the login page being corresponding to a second web page;

displaying a network application icon representing an application used for Internet access on the login page;

receiving a clicking operation on the network application icon;

sending, by the application, a first data to a network server, the first data comprising a hardware information of the wireless access point and the computing terminal for the network server to authenticate the network connection, including:

sending, by the browser, a request message to the wireless access point to request the wireless access point to temporarily lift a restriction, wherein the request message carries the first data comprising the hardware information of the wireless access point and the computing terminal, and the first data comprising the hardware information of the wireless access point and the computing terminal is stored in the wireless access point;

after the wireless access point temporarily lifts the restriction successfully, receiving, by the browser from the wireless access point, the first data comprising the hardware information of the wireless access point and the computing terminal, to temporarily allow the computing terminal to pass through the wireless access point for Internet access; and making the network connection when authentication on the first data succeeds, comprising:

receiving and displaying, by the browser, data of a multi-media page after authentication on the first data by the network server succeeds, wherein the network server controls the wireless access point to lift the network restriction; and exchanging network data with the wireless access point.

8. The non-transitory computer storage medium according to claim 7, wherein the receiving the clicking operation on the network application icon, and sending, by the application, the first data to a network server comprises:

after the wireless access point temporarily lifts the restriction successfully, sending the first data to the application, so that the application obtains the multi-media page from an application server according to the first data, wherein the application accesses the multi-media page, and sends the first data to the network server; and Internet access authentication succeeds when authentication on the first data by the network server succeeds.

9. The non-transitory computer storage medium according to claim 7, wherein when the wireless access point is requested to temporarily lift the restriction, device information is sent to the wireless access point by using a request message; and after the wireless access point temporarily lifts the restriction successfully, a temporarily lifting restriction success message sent by the wireless access point is received, the temporarily lifting restriction success message comprising the first data.

* * * * *